United States Patent
Blackwelder et al.

[11] Patent Number: 6,042,907
[45] Date of Patent: Mar. 28, 2000

[54] COEXTRUSION OF MULTILAYER FILM FOR CONTAINER SLEEVE LABELS

[75] Inventors: Maurice W. Blackwelder; Louis M. DiBello, both of Bardstown, Ky.

[73] Assignee: Owens-Illinois Labels Inc., Toledo, Ohio

[21] Appl. No.: 08/919,371

[22] Filed: Aug. 28, 1997

[51] Int. Cl.[7] ............................ B32B 27/32; B45D 23/08
[52] U.S. Cl. .................... 428/35.2; 428/35.7; 428/36.91; 428/195; 428/213; 428/517; 428/519; 428/910; 215/386
[58] Field of Search ..................... 428/517, 519, 428/521, 215, 910, 35.7, 36.91, 34.9, 36.5, 35.2, 213, 195; 215/386

[56] References Cited

U.S. PATENT DOCUMENTS

| | | | |
|---|---|---|---|
| 3,985,931 | 10/1976 | Blackwelder | 428/318.8 |
| 4,049,768 | 9/1977 | Luthrs | 264/45.5 |
| 4,386,125 | 5/1983 | Shiraki et al. | 428/910 |
| 4,486,366 | 12/1984 | Reddy | 264/416 |
| 4,581,262 | 4/1986 | Karabedian | 428/34.7 |
| 4,585,679 | 4/1986 | Karabedian | 428/34.7 |
| 4,626,455 | 12/1986 | Karabedian | 428/34.7 |
| 4,883,697 | 11/1989 | Dornbusch et al. | 428/35.7 |
| 5,079,057 | 1/1992 | Heider | 428/36.5 |
| 5,082,608 | 1/1992 | Karabedian et al. | 264/46.1 |
| 5,405,667 | 4/1995 | Heider | 428/35.7 |
| 5,516,393 | 5/1996 | Freedman | 156/229 |
| 5,753,326 | 5/1998 | Blackwelder | 428/34.9 |
| 5,861,201 | 1/1999 | Blackwelder et al. | 428/36.91 |
| 5,891,537 | 4/1999 | Yoshii et al. | 428/35.7 |

*Primary Examiner*—Rena L. Dye

[57] ABSTRACT

A multilayer sheet, which is particularly well adapted for use as as a label sleeve on carbonated beverage containers, includes first and second coextruded unfoamed layers of polymer compositions each consisting essentially of polyolefin, polystyrene and a compatibility agent. The polyolefin and polystyrene are in a weight ratio in the range of about 30/70 to 70/30, and the compatibility agent is in the amount of about 5% to 10% by total weight. A pigment in the amount of about 10% to 15% by total weight may be included in one or both of the coextruded layers. The polyolefin preferably is selected from the group consisting of polypropylene, polyethylene and mixtures thereof, and the compatibility agent preferably comprises a styrene-ethylene/butylene-styrene block copolymer. One of the unfoamed layers preferably is thicker and of higher strength than the other layer, while the other layer has a smooth uniform exterior surface.

14 Claims, 2 Drawing Sheets

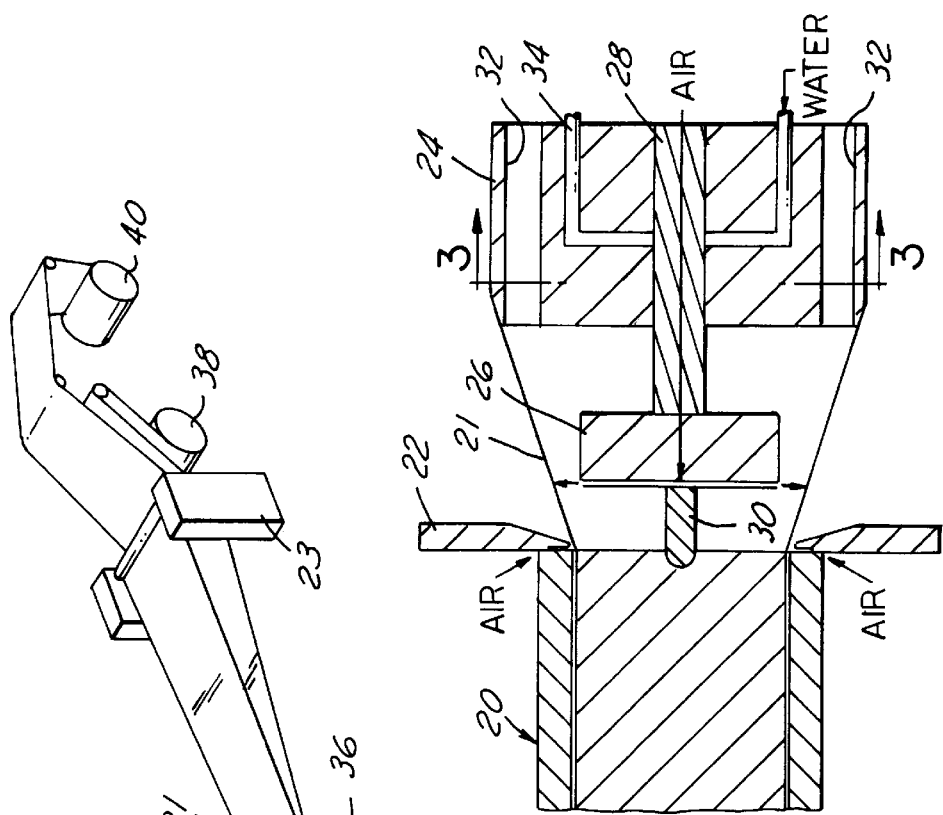
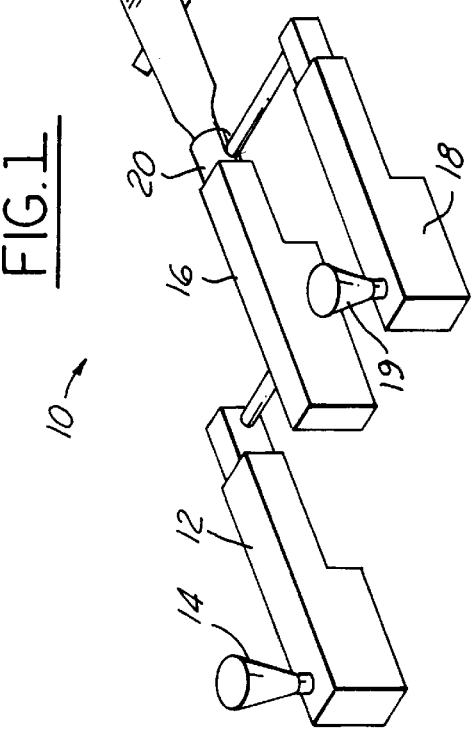
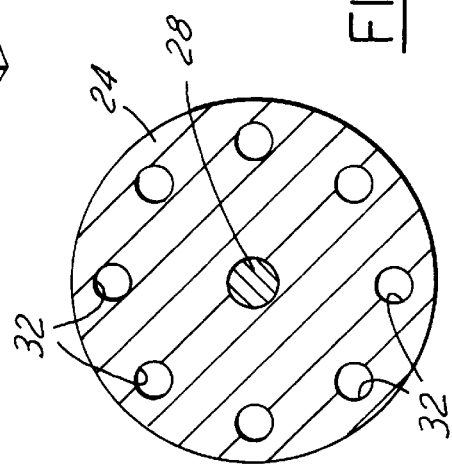
FIG.1
FIG.2
FIG.3

COEXTRUSION OF MULTILAYER FILM FOR CONTAINER SLEEVE LABELS

The present invention is directed to sleeve labels for beverage containers, and more particularly to a method and system for coextruding an improved multilayer sheet for such sleeve labels.

BACKGROUND AND OBJECTS OF THE INVENTION

U.S. Pat. No. 5,322,664 assigned to the assignee hereof, discloses a method and apparatus for making a clear single-layer non-foam polystyrene film for use as a sleeve label. A blend of crystal polystyrene containing no mineral oil and a block copolymer is extruded through an annular orifice and then stretched over a cooling mandrel. The film is stretched in both the machine direction and cross direction. The film may be formed into sleeves with the machine stretch direction oriented circumferentially, and then shrunk onto beverage containers.

It is well known that polyolefins, such as polyethylene and polypropylene, have better toughness and strength characteristics than polystyrene. However, polystyrene offers attributes superior to polyolefins in terms of stiffness and machinability. Efforts to overcome some of the limitations in properties of polyolefins, polypropylene in particular, have been to produce films or sheets with high levels of orientation in both machine and cross directions (biaxial orientation). Such techniques require substantial equipment investment and high capacity requirements.

Polystyrene is an amorphous material with excellent stiffness, cutting and machining qualities. It can be blended or polymerized with butadiene or other rubber-type modifying materials to increase its toughness and strength characteristics. It can also be extruded with a much lower equipment investment than biaxial orientation equipment for polypropylene. However, even by using undesirable amounts of liquid plasticizers or very expensive copolymers, the load force necessary to make polystyrene stretch exceeds values for polypropylene and values required in some market applications. One example where stretch under a low force is desirable is with label stock for PET carbonated beverage containers. Carbonated beverages are bottled at low temperature, around 50° F. Labels are applied to the containers either before or after filling with the beverage. These labels are wrapped around the containers in the machine direction axis of the sheet, with the ends being overlapped and bonded by a hot melt adhesive. As the beverage in the bottle warms to room temperature, the pressure created by carbonization makes the container expand, exerting a circumferential force on the container label. For example, a two liter bottle with carbonated content at typical carbonation levels can increase in diameter sufficiently to increase the circumferential dimension of the container 0.10 inches or more. The hot melt adhesives used in the beverage labeling industry are formulated for ease of processing, and typically do not possess high sheer strength at room temperature. It is therefore necessary that the label be such as to stretch at a lower force load than the sheer strength of the adhesive in order to accommodate expansion of the container without fracture at the label seam. This force load is typically less than four pounds. Label stock of high impact polystyrene typically require in excess of four pounds to stretch the required 0.10 inches.

Polyolefins and polystyrene, normally incompatible, can be made compatible by use of a compatibility agent, such as a styrene-ethylene/butylene-styrene block copolymer. However, processing problems created by the nature of the blends of amorphous polystyrene and crystalline polypropylene have resisted commercial applications of this technology. With a significant amount of polypropylene (above 40%) combined with polystyrene, the blend has a low melt strength that creates problems in extruding a sheet, particularly one that has a low caliper and is commercially economically viable. The presence of the polypropylene also makes the extruded sheet sensitive to a condition known as scaling (similar to fish scales), which is an appearance blemish visible as a chevron pattern with variable opacity.

It is therefore an object of the present invention to provide a multilayer sheet and method of manufacture adapted for use as a label sleeve on containers that combine the desirable properties of polyolefins in terms of toughness and strength, and the desirable properties of polystyrene in terms of stiffness and machinability. Another object of the present invention is to provide a system and method for coextruding a sheet film of polyolefin and polystyrene composition that are economical to implement, and that provide sleeve labels having the desirable properties described above. A further object of the present invention is to provide a container for carbonated beverages having a sleeve label in accordance with the present invention secured thereto.

SUMMARY OF THE INVENTION

A multilayer sheet in accordance with a presently preferred embodiment of the invention, which is particularly well adapted for use as a label sleeve on carbonated beverage containers, includes first and second coextruded unfoamed layers of polymer composition consisting essentially of polyolefin, polystyrene and a compatibility agent. The polyolefin and polystyrene are in a weight ratio in the range of about 30/70 to 70/30, and the compatibility agent is in the amount of about 5% to 10% by total weight. A pigment in the amount of about 10% to 15% by total weight may be included in one or both of the coextruded layers. The polyolefin preferably is selected from the group consisting of polypropylene, propylene/ethylene copolymers, propylene/butylene copolymers, propylene/ethylene/butylene copolymers and mixtures thereof, and the compatibility agent preferably comprises a styrene-ethylene/butylene-styrene block copolymer or a styrene-butadiene-styrene block copolymer. One of the unfoamed layers preferably is thicker and of higher strength than the other layer, while the other layer has a smooth uniform exterior surface.

The coextruded multilayer sheet preferably is fabricated by directing polymer material from first and second extrusion devices to an extrusion die in such a way that the polymer materials from the first and second extrusion devices exit the die as respective coextruded first and second layers of a composite sheet. Strength and appearance properties of the coextruded sheet are obtained by controlling temperature of the polymer materials as they enter the extrusion die such that the polymer material from one extrusion device enters the die at a different temperature from that entering the extrusion die from the other extrusion device. In particular, the polymer material is cooled at one extrusion device so as to enter the die at a lower temperature than the material from the other extrusion device. This lower temperature greatly enhances the strength characteristics of the resulting sheet. To obtain desirable appearance qualities in the resulting sheet, the coextruded first and second layers are cooled at different rates downstream of the extrusion die. In particular, the layer of material that was cooled prior to extrusion through the die is further cooled downstream of the die at a slower rate than the other layer.

In the preferred embodiment of the invention, the sheet is extruded through an annular extrusion die from which the layers exit as a composite conical film. Cooling air is directed onto the outer layer as the composite film exits the die, while cooling air is directed onto the inner layer at a position spaced downstream from the die in the direction of extrusion through the die. This delayed cooling of the inner layer after extrusion has been found to eliminate scaling in the inner layer. The extrusion process of the present invention preferably also includes stretching the film axially and circumferentially by pulling the film over a mandrel having a diameter greater than that of the extrusion die while cooling the mandrel to extract heat from the film. The film is cut diametrically downstream of the cooling mandrel and wound into coils of sheet material for further processing.

BRIEF DESCRIPTION OF THE DRAWINGS

The invention, together with additional objects, features and advantages thereof, will be best understood from the following description, the appended claims and the accompanying drawings in which:

FIG. 1 is a schematic diagram of a system for coextruding a multilayer sheet in accordance with a presently preferred embodiment of the invention;

FIG. 2 is a sectional view on an enlarged scale of a portion of the system illustrated in FIG. 1;

FIG. 3 is a sectional view taken substantially along the line 3—3 in FIG. 2;

DETAILED DESCRIPTION OF PREFERRED EMBODIMENTS

Figure 4:
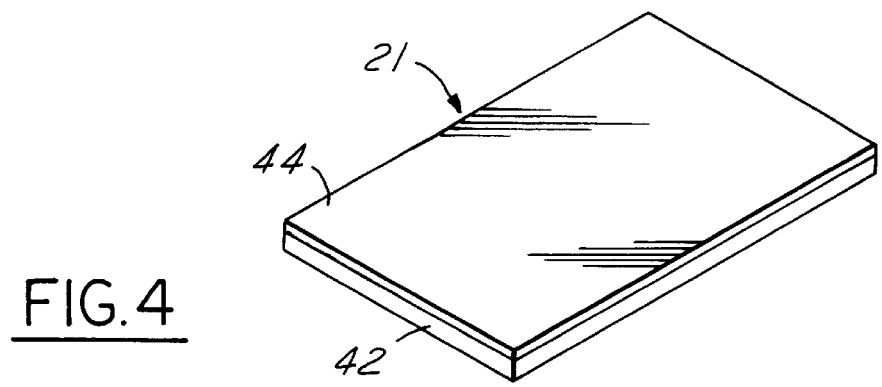
FIG. 4 is a perspective view of a multilayer sheet formed in accordance with the present invention.

FIG. 1 illustrates a system 10 for forming a multilayer sheet adapted for use as a label sleeve on a container in accordance with a presently preferred embodiment of the invention. A first mixing extruder 12 receives material from a hopper 14 for melting and mixing the material, and directing the material at elevated temperature to a cooling extruder 16. A second or satellite extruder 18 has a hopper 19 for receiving raw material to be extruded, and feeds extrudate at elevated temperature to an annular coextrusion die 20. The extrudate streams are directed through die 20 in such a way that the material from extruders 12, 16 forms an inner layer and the material from extruder 18 forms an outer layer of the extrudate 21 that flows through die 20.

An air ring 22 (FIG. 2) is disposed at the outlet of annular die 20 for directing cooling air onto the outer layer of the annular film 21 as the film exits die 20. The film is pulled by nip rolls 23 from die 20 over a cooling mandrel 24 (FIGS. 2 and 3) in such a way that the film is stretched both axially in a machine direction and circumferentially in a cross direction as the film flows from die 20 to mandrel 24. An inner air ring 26 is mounted on a shaft 28 that extends from mandrel 24, and is spaced from the end of die 20 by a spacer 30. Ring 26 receives cooling air, and directs the cooling air radially outwardly against the inner layer of film 21 at a position, determined by spacer 30, downstream from die 20 and outer ring 22. A circumferential array of passages 32 extend axially through mandrel 24 for passage of the air from ring 26 so that film 21 does not expand or balloon from air pressure. A passage 34 in mandrel 24 also provides for water-cooling of the mandrel. Downstream from mandrel 24, there is disposed a cutter knife 36 for cutting film 21 diametrically across the film. From knife 36, the separated film strips extend to nip rolls 23, and thence to winders 38, 40 for coiling the separated sheet into separate coils.

The material components of the desired polymer formulation are mixed and fed to extruders 12, 18 by means of hoppers 14, 19. The rates of flow at extruder pair 12, 14 and at extruder 18 are selected so as to provide the desired layer thicknesses at film 21 (FIGS. 1, 2 and 4). As noted above, the extrudate from extruder pair 12, 14 forms the inner layer 42 of the multilayer film 21, while the material from extruder 18 forms the outer layer 44. Film 21 forms a frustroconical shape as it emerges from annular die 20 and is drawn over the mandrel. Annular ring 22 closely adjacent to the extruder die provides immediate cooling air flow to the outer layer of the tubular web as it emerges from the die. Suitable controls for volume and temperature are used for the forced air cooling. Inner ring 26 applies controlled volume and temperature forced air cooling downstream from the die face. Mandrel 24 is plated with nickel/chrome and is highly polished. This slick smooth surface improves the surface of the film produced and contributes to control of web tension between the mandrel and pull nip rolls 23. In one implementation of the present invention, extruder 12 comprises a 4 ½ inch (30:1) extruder, while extruder 16 comprises a 6 inch (24:1) secondary cooling extruder. Satellite extruder 18 is a 2 ½ inch (24:1) extruder. Die 20 is a 16 ¼ inch coextrusion two-layer annular rotary die, while mandrel 24 is a 28 ½ inch cooling mandrel with a high finish smooth nickel/chrome surface. Inner ring 26 is located 5 ¼ inches downstream from the face of die 20, and the cooling water applied to mandrel 24 is maintained at 160° F. The mandrel and die are sized to provide a stretch ratio (die diameter to mandrel diameter) of 1.75.

Extruder 16 is employed strictly to cool the melt from extruder 12, which will increase its strength. In one implementation of the invention, the melt from extruder 12 is at about 425° F., and is cooled to about 325° F. during passage through extruder 16 to die 20. While this cooling increases melt strength, it also has some negative effects on smoothness and appearance of the formed sheet. The second thin layer from extruder 18 is coextruded on the outside of the tubular film, and has a melt temperature of about 400° F. as it exits extruder 18 to die 20. This preferred temperature differential was arrived at by trial and error employing the specific materials hereinafter described. Other temperature differentials may be suitable for other materials. The cooled inner layer with increased melt strength provides support for the hot thin outer layer. By extruding the outer layer at elevated temperature, it develops the desire properties of gloss and smoothness with uniform appearance over the surface of the precooled inner layer.

It has also been found that further cooling of the precooled inner layer must be accomplished at a slower rate after exit from extrusion die 20, as compared with rapid cooling of the outer layer by ring 22. This lower cooling rate for the inner layer helps prevent scaling at the inner layer. Air ring 26 and mandrel 24 are closely axially aligned with extrusion die 20. In this way, air ring 26 is centered and equidistant from web 21 in total circumference. This also accomplishes the objective of providing a slower cooling rate for the inner layer due to being further away from the material than if air ring 26 were mounted on the opposing face of die 20, as is typical in the prior art. The leading or nose portion of mandrel 24 has a slight taper so that film 21 contacts the mandrel at a smaller diameter than the body of the mandrel. This helps ensure that the material will make intimate contact over the outer diameter of the mandrel, which then creates the tension needed between the mandrel and the pull nip rolls for achieving the desired amount of stretch in the axial or machine direction. Changes in the temperature of the mandrel, by means of controlling temperature of water flowing through cooling passages 34, can be used to increase or decrease this web tension. Lower temperatures increase tension while higher temperatures decrease tension.

A number of tests have been run in implementation of the invention. In these tests, the rate of flow through extruders 12, 16, 18 were such as to provide a total material thickness of about 1.5 to 2.5 mils. It is preferred that the thickness of the inner layer be two to eight times the thickness of the outer layer. It is considered preferable to maintain layer 44 at a thickness of about 0.2 to 0.3 mil. A currently preferred construction has an inner layer 42 of about 1.2 mils thickness and outer layer 44 of about 0.3 mils thickness. The following materials were used: (1) Shell Chemical Co. DS6D82 - a propylene/ethylene copolymer having a melt flow rate of 7.0 gms./10 min. and a melting point (by DSC) of 136° C.; (2) Huntsman Chemical Co. 203 - a general purpose polystyrene having a melt flow rate of 8.0 (condition G); (3) Shell Chemical Co. Kraton 1657 - a linear styrene-ethylene/butylene-styrene block copolymer having a styrene-to-rubber ratio of 13 to 87 (Kraton D1102 would be a suitable triblock styrene-butadiene-styrene block copolymer compatibility agent, and Kraton D1184 would be a suitable radial styrene-butadiene-styrene block copolymer compatibility agent); and (4) O'Neil $TiO_2$ white concentrate containing 60% $TiO_2$ and 40% polystyrene. Formulations have been extruded varying the weight ratio of polystyrene to polypropylene/polyethylene from 30/70 through 40/60, 50/50, 60/40 to 70/30. To these blends, the Kraton compatibility agent was varied from 5% to 10% by total weight, and the pigment concentration from 10% to 15% by weight.

Physical property data are shown in Table I for the blend of 50/50 polystyrene to propylene/ethylene copolymer containing 10% compatibility agent and 15% pigment concentration, with comparison data for a commercial grade polystyrene sheet and a biaxially oriented polypropylene sheet. These sheets are low gauge film-like materials suitable for use as substrates in laminated structures with clear polypropylene film for the carbonated beverage market.

TABLE I

| Physical Properties Unlaminated Substrate | | | |
|---|---|---|---|
| | Polystyrene | PS/PP Blend | Polypropylene |
| Caliper (mils) | 1.6 | 1.7 | 1.3 |
| Density (PCF) | 52 | 49 | 42 |
| MD* Yield (PSI) | 6311 | 4040 | 2770 |
| MD Elongation (%) | 29 | 45 | 97 |
| MD Break (PSI) | 5760 | 5340 | 9439 |
| MD Modulus (PSI x $10^5$) | 2.6 | 1.6 | 0.2 |
| MD Stiffness (MGS) | 4.6 | 3.8 | 2.4 |
| CD* Yield (PSI) | 3290 | 1500 | 13580 |
| CD Elongation (%) | 35 | 18 | 23 |
| CD Break (PSI) | 3360 | 1470 | 17920 |
| CD Modulus (PSI x $10^5$) | 2.3 | 0.9 | 0.2 |

TABLE I-continued

| Physical Properties Unlaminated Substrate | | | |
|---|---|---|---|
| | Polystyrene | PS/PP Blend | Polypropylene |
| CD Stiffness (GS) | 2.2 | 1.8 | 4.0 |
| CD Tear (Lbs.) | 3.8 | 3.8 | 8.1 |

*Machine Direction,
**Cross Direction

In comparing this data, it is important to recognize that the polypropylene sheet is strongly biaxially oriented, with the greater orientation being in the cross direction. The polystyrene sheet and the polystyrene/polypropylene blend sheet of the present invention were made without special entering frame orientation (machine direction and cross direction stretching) equipment. Since a container label is typically wrapped with the machine direction orientation circumferentially around the container, the machine direction orientation is the more critical property requirement. As can be seen from the data of Table I, the following properties of the polystyrene/polypropylene blend materials of the present invention fall between those of the polystyrene and polypropylene: MD yield, MD elongation, MD tinsel brake and MD tensile modulus. The data thus shows that the polystyrene and polypropylene have individually affected the final properties of the polystyrene/polypropylene blend materials of the invention, and that the material of the invention has assumed attributes of both the polystyrene and polypropylene. A currently preferred sheet construction has a layer 42 of 60% polystyrene and 40% polypropylene (with compatibility agent) and a layer 44 of 70% polystyrene and 30% polypropylene (with compatibility agent). Thus, the sheet compositions need not be identical, although a radical difference in composition could result in curling.

Figure 6:
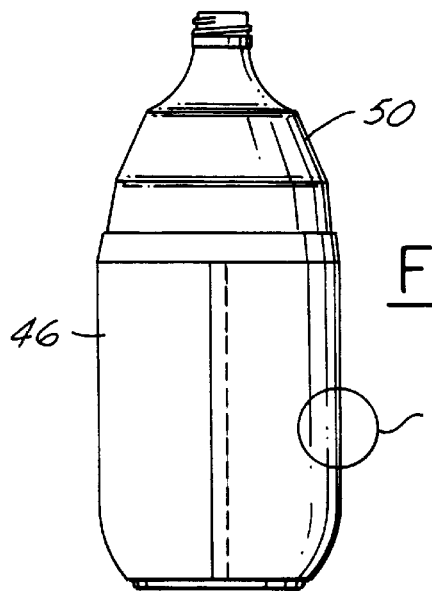
FIG. 6 is an elevational view of a carbonated beverage container in accordance with a presently preferred implementation of the invention.
Figure 7:
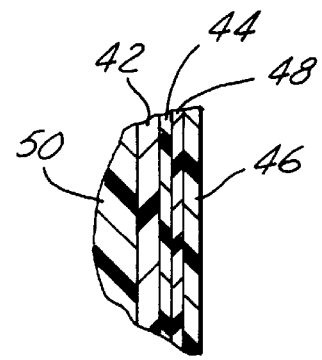
FIG. 7 is a fragmentary view on an enlarged scale of the portion of FIG. 6 within the circle 7.

Referring to FIGS. 6 and 7, the preferred form or structure of a beverage label is for the opaque two-layer substrate 42, 44 of the present invention to be adhesively laminated with a thin clear biaxially oriented polypropylene film 46, with a printed design affixed to the inside, and an adhesive layer 48 sandwiched between layers 46, 44. The thin gauge oriented polypropylene film 46 provides high gloss and a protective layer over the printed layer 48 to prevent scuffing or abrasion of the inks. In recycling the labeled PET bottles 50 after use, the bottles and labels are ground up together and exposed to a rinse cycle. With the laminated structure illustrated in FIG. 7, the inks in layer 48 are still protected from chemical attack by the rinse solution, and the label material can be separated from the bottle material to be salvaged without ink color contamination of the bottle material. Listed below in Table II are physical properties of the three substrates shown in Table I after adhesive lamination with a seventy gauge clear biaxially oriented polypropylene film 46:

TABLE II

| Physical Properties Laminated Structures | | | |
|---|---|---|---|
| Property | Polystyrene | PS/PP Blend | Polypropylene |
| Caliper (mils) | 2.3 | 2.4 | 2.0 |
| Density (PCF) | 55.3 | 53.6 | 46.0 |
| MD Yield (PSI) | 6389 | 4951 | 3880 |
| MD Elongation (%) | 59 | 79 | 124 |
| MD Break (PSI) | 8496 | 9435 | 12550 |
| MD Modulus (PSI x 10 x $10^5$) | 2.9 | 2.4 | 2.4 |

TABLE II-continued

Physical Properties Laminated Structures

| Property | Polystyrene | PS/PP Blend | Polypropylene |
|---|---|---|---|
| MD Stiffness (MGS) | 14.5 | 15.6 | 7.4 |
| CD Tear (Lbs) | 11.2 | 16.2 | 17.9 |

Figure 5:
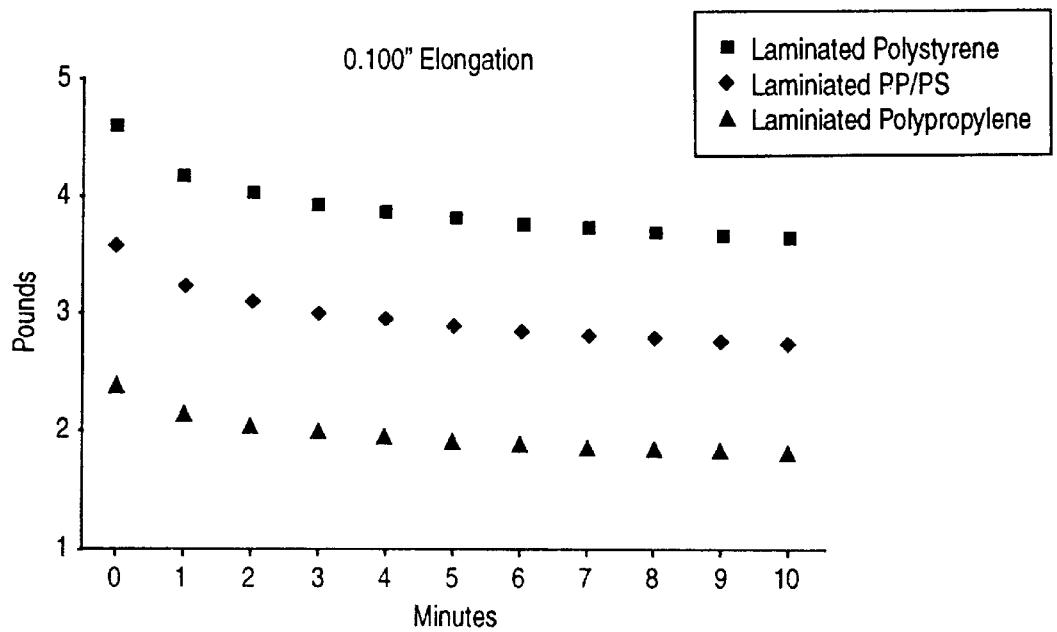
FIG. 5 is a graph that illustrates a characteristic of the present invention.

The data in Table II show that the polystyrene/polypropylene blend material of the present invention has produced a laminated sheet having the beneficial qualities of both polystyrene and polypropylene, while reducing the negative performance aspects of each. This may be further demonstrated by a test closely related to the label performance on a carbonated beverage container, which slowly expands in diameter as the beverage warms from about 50° F. to room temperature as typical in the beverage industry. Sample strips 0.5 inches wide of each of the three label materials were stretched 0.10 inches on a standard Instron tensile tester at a speed of 0.02 inches/minute. The force necessary to obtain the 0.10 inch elongation was recorded. The samples were held in stretched condition for 10 minutes, with the force (strain) recorded each minute. FIG. 5 is a graph that shows the results on the three different types of label specimens. As can be seen, the force data for the label material prepared with a substrate from the polystyrene/polypropylene blend of the present invention falls approximately half way between the polystyrene and the polypropylene samples. One objective of this invention was to develop a material which would stretch at a lower force value than possible with polystyrene, but would not be subject to stretching at the low force values demonstrated for polypropylene. The polystyrene/polypropylene blend prepared in accordance with the present invention clearly accomplishes this objective. The invention therefore provides a multilayer sheet material adapted for use as a label sleeve on containers, as well as a method and apparatus for forming such sheet and a label formed therefrom, that combines the attributes of both polystyrene and polypropylene while eliminating the negative features inherent in these individual materials, resulting in a label material for carbonated beverage containers that is superior in performance to labels made from either polystyrene or polypropylene alone.

We claim:

1. A multilayer sheet adapted for use as a label sleeve on containers that comprises first and second coextruded unfoamed layers of polymer composition consisting essentially of polyolefin, polystyrene and a compatibility agent.

2. The sheet set forth in claim 1 wherein said polymer composition consists essentially of polyolefin and polystyrene in a weight ratio range of about 30/70 to 70/30, and a compatibility agent in the amount of about 5 to 10% by weight.

3. The sheet set forth in claim 2 wherein at least one of said layers includes pigment in the amount of about 10 to 15% by total weight of said sheet.

4. The sheet set forth in claim 2 wherein said polyolefin is selected from the group consisting of polypropylene, propylene/ethylene copolymers, propylene/butylene copolymers, propylene/ethylene/butylene copolymers, and mixtures thereof.

5. The sheet set forth in claim 2 wherein said compatibility agent comprises a styrene-ethylene/butylene-styrene block copolymer or a styrene-butadiene-styrene block copolymer.

6. The sheet set forth in claim 1 wherein one of said layers is thicker than the other of said layers.

7. The sheet set forth in claim 6 wherein said one layer is in the range of about two to eight times the thickness of said other layer.

8. The sheet set forth in claim 7 wherein said one layer is about four times as thick as said other layer.

9. A label sleeve for a container that comprises first and second coextruded biaxially oriented unfoamed layers of polymeric composition that consists essentially of polyolefin, polystyrene and a compatibility agent, said first layer being positioned within said second layer such that, when the label is applied to a container exterior surface, said first layer is closer to the container surface than said second layer, said first layer being thicker and of higher strength than said second layer, and said second layer having a smooth uniform exterior surface.

10. The label sleeve set forth in claim 9 having ends bonded to each other by hot melt adhesive, wherein said first layer has as a lower stretch force rate than the shear strength of the hot melt adhesive.

11. The label sleeve set forth in claim 9 further comprising a third clear biaxially oriented layer bearing a preprinted design, and a fourth adhesive layer between said second layer and said third layer.

12. The sleeve label set forth in claim 10 in combination with a carbonated beverage container of PET composition, in which the sleeve label is disposed around said container with said first layer being in surface contact with the container.

13. A carbonated beverage container of PET composition and a sleeve label disposed around said container and comprised of first and second coextruded biaxially oriented unfoamed layers of polymeric composition that consists essentially of polyolefin, polystyrene and as a compatibility agent, said first layer being positioned radially inwardly of said second layer and being thicker and of higher strength than said second layer, and said second layer having a smooth uniform exterior surface.

14. The container set forth in claim 13 wherein said sleeve label further comprises a third layer disposed outside of said second layer and bearing a preprinted design, and a fourth clear biaxially oriented layer outside of said third layer.

* * * * *